United States Patent Office 3,551,809
Patented Dec. 29, 1970

3,551,809
APPARATUS FOR ELIMINATING DIGITAL INDICATOR FLUCTUATIONS
Paolo Dufour, Via Bovio 3, Genoa, Italy
Filed May 18, 1967, Ser. No. 639,394
Int. Cl. G01r 17/06
U.S. Cl. 324—99                    2 Claims

ABSTRACT OF THE DISCLOSURE

Conversion of a given quantity from analog to digital form gives rise often to a fluctuation in the last digit or digits visually indicated. This fluctuation, which prevents an exact reading of the digits, is prevented by adding to (or subtracting from) the quantity being digitally indicated a known quantity smaller than unity. This method is carried out by means of a flip-flop circuit (provided with suitable relays) connected to an analog digital converter.

---

The present invention is related to a method for eliminating visual fluctuations in and, thus, improving the readability of digital indicators, specifically indicators wherein the value of the quantity to be measured is represented by one or more digits, which generally appear visually in a specific "window" position of the indicator.

To represent visually in digital form an analog quantity, this quantity must be, previously, subjected to an appropriate conversion from analog quantity to digital quantity. This conversion is effected by means of any analog digital converter known to the person skilled in the art.

Because of uncertainties characteristic of any analog digital conversion, or because of variations, however small, in the quantity to be measured, it is possible that the last digit of the number or quantity represented be caused to fluctuate erratically between any two adjoining values, thereby rendering very difficult, or even impossible, to read with certainty the digit indicated. The possibility of such fluctuations to occur becomes a reality whenever the value to be measured approaches a value which is a multiple of the basic unit of the system.

Furthermore, in the event that the last digit of the number to be measured is a zero or a nine, the fluctuation of that digit extends also to the preceding digit of the number as it is mathematically understandable.

It is, therefore, the main object of the present invention to provide a method for eliminating these disadvantageous fluctuations in the reading of digital representations, such method comprising the addition to (or subtraction from) the value to be measured of a known quantity smaller than the basic unit of the system, that is, smaller than the minimum value which gives a reading different from zero.

A further object of this invention is to provide a device capable of carrying out the method mentioned herebefore, said device comprising in combination an analog digital converter, a flip-flop circuit which detects the transition from an even value to either of its two adjoining odd values and actuates means for adding to (or subtracting from) the value to be measured another value which is known and predetermined.

Figure 1:
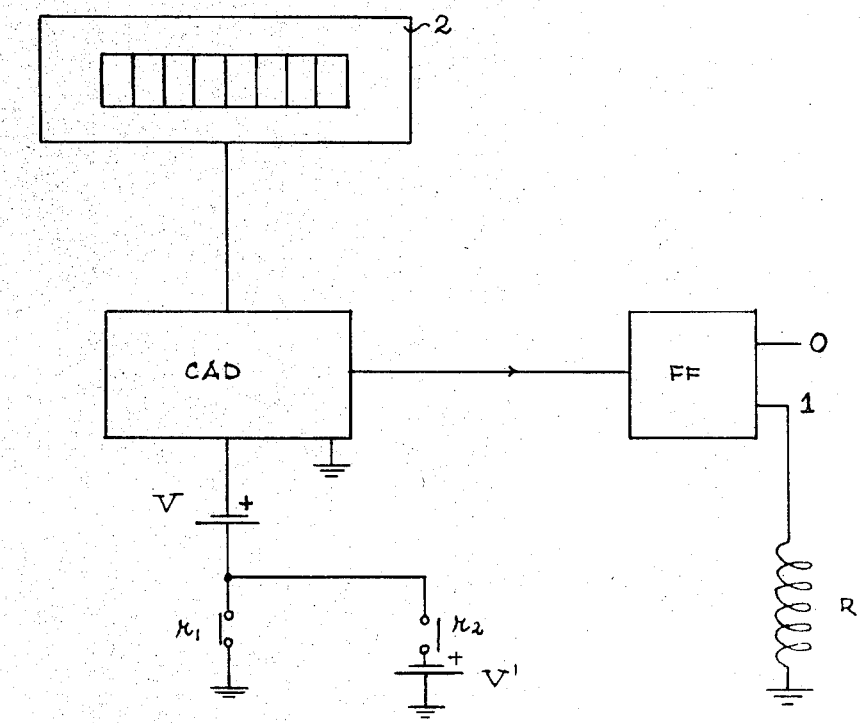
Figure 2:
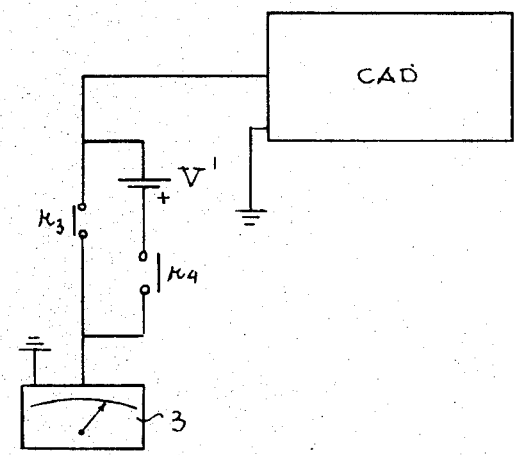

These and other objects and advantages of the invention will become apparent from the following detailed description thereof and from the accompanying drawings, in which:

FIG. 1 represents schematically a first embodiment of the device of the invention, and FIG. 2 shows a second embodiment of said device, wherein the variation in quantity to be measured is directly indicated by means of a specific indicator.

Referring now to the drawings, and specifically to FIG. 1, let it be assumed that the quantity or value to be measured is a voltage V. Obviously, it is well known that if the quantity or value to be measured is a different parameter, this can be readily translated to its respective and proportional voltage value.

One of the two terminals of V is connected directly to the input of an analog digital converter CAD, while the other terminal is grounded through a contact $r_1$ (normally closed) of a relay (not shown).

A small voltage V', the value of which is less than the minimum quantity or unit value visually measurable, is connected to ground through one terminal and to V through the other terminal and contact $r_2$ (normally open) of the relay.

Converter CAD has one output connected to an indicator 2 which visually shows the digits, and another output connected to a flip-flop circuit FF which can assume one of two positions, namely the 0 position or the 1 position. The output corresponding to the 1 position, suitably amplified, is connected to coil R of the relay mentioned above.

The operation of the described device is as follows: Let it be assumed that voltage V is directly connected to ground and to converter CAD, and let it be assumed that CAD is connected to indicator 2. Consequently, in the indicator 2 occurs the heretofore mentioned phenomenon defined as fluctuation of the digits, one or more digits being involved in such aberration.

When the device of FIG. 1 is operative, each and every electric impulse generated by the converter CAD and passed to the indicator 2 is accompanied by an electric impulse to the flip-flop circuit FF, which then changes position. Upon transition from the 0 position to the 1 position, the circuit FF will energize the relay, thereby causing contact $r_1$ to open and contact $r_2$ to close. As a result, voltage V is no longer applied to converter CAD, but voltage $V+V'$ will be applied (or voltage $V-V'$, depending on the polarity), and this additional value V' is such that it eliminates completely the existing fluctuation in the digits of the indicator 2.

When a new signal is given, which brings the indication of indicator 2 to an even value, the flip-flop circuit FF will return to its original 0 position. This means that the relay will become deenergized, the contacts $r_1$ and $r_2$ will return to their original condition and the voltage V will be applied to the converter (V' having, thus, been shunted out).

Referring to FIG. 2, the device of FIG. 1 is seen modified by the addition of two other contacts: $r_3$ (normally closed and in parallel with V') and $r_4$ (normally open and in series with V'). The two branches in parallel are connected with converter CAD as well as with a meter 3 of the analog variety (namely, an analog with a pointer). The rest of the circuitry is as shown in FIG. 1.

In operation, when V' is applied to converter CAD, meter 3 indicates this specific application of voltage and measures its value, whereby the overall reading obtainable from both indicator 2 and meter 3 is more complete and accurate.

It is to be understood that many a variance is possible without departing from the scope of the present invention, the above being described by way of illustration and not of limitation.

What is claimed is:
1. An apparatus for eliminating the digital fluctuation in digital indicators comprising in combination:
   (a) a digital indicator;

(b) an analog-digital converter for effecting a conversion of the quantity to be indicated from analog to digital, and having its output connected to said digital indicator;

(c) means for detecting the transition from one value of the least significant digit to be displayed to either of the two adjoining values, said means being in cooperative circuit relation with said converter;

(d) a relay having at least a normally open and a normally closed pair of contacts and an energizing coil in cooperative circuit relation with said detection means whereby in response to the transition from one value of the least significant digit to an adjoining value said relay causes the addition to or subtraction from said one value a predetermined quantity smaller in value than the basic unit of said indicator.

2. An apparatus as recited in claim 1, wherein said detecting means comprises a flip-flop circuit having the output of one state of said flip-flop connected to said relay coil for the energization thereof.

References Cited

UNITED STATES PATENTS 3,105,230   9/1963   MacIntyre _____ 340—347

RUDOLPH V. ROLINEC, Primary Examiner

E. F. KARLSEN, Assistant Examiner

U.S. Cl. X.R.

235—92